United States Patent Office 3,499,137
Patented Mar. 3, 1970

3,499,137
PROTECTIVE ARRANGEMENT FOR THE
WELDING FIELD IN THE CASE OF ARC
WELDING
Marcel Hendrik Meulemans, Mol-Donk, Belgium, assignor to Centre d'Etude de l'Energie Nucleaire, C.E.N., Brussels, Belgium
Filed Mar. 17, 1967, Ser. No. 624,076
Claims priority, application Luxembourg, Mar. 18, 1966, 50,701
Int. Cl. B23k 9/16, 35/38
U.S. Cl. 219—72                                                                   7 Claims

ABSTRACT OF THE DISCLOSURE

The invention relates to a protective arrangement for the welding field in the case of arc welding elements comprising a metal reactive at high temperatures in the presence of air. This arrangement is of particular interest when arc welding plugs on to tubes which normally cannot be welded in free air. The arrangement comprises a casing so as to surround the welding field, provided with an inlet port for an inert gas and an exhaust port for the said gas, a substantially laminar flow of the gas taking place inbetween the said two ports, thus preventing the blow-out of the arc built up between an electrode and the components to be welded.

---

The present invention has for its object a protective arrangement for the welding field in the case of arc welding elements comprising a metal reactive at high temperatures in the presence of air.

This arrangement is used in particular when arc welding plugs on to tubes which normally cannot be welded in free air, this being particularly the case of zirconium alloy fuel elements.

The method adopted at present for arc welding the said elements comprises the steps of introducing these elements in a vacuum chamber, followed by exhausting the air down to a pressure of $10^{-5}$ mm. mercury magnitude and to introduce in the vacuum chamber argon of high grade purity. It is only after the said precautionary measures shall have been carried out that the welding of the said elements takes place.

In order to restrict the argon consumption, the users of the said method are obliged to apply a system of recycling and chemical purification of the used argon, the latter being indeed liable to become contaminated by the atmospheric gases adsorbed on the inner walls of the vacuum chamber.

On account of the fact that this method calls for the use of a vacuum chamber of a fairly considerable volume, it is also necessary to provide powerful vacuum pumps. In addition a large quantity of argon has to be used to protect very small welding areas.

The object of the invention is essentially to overcome the said disadvantages and to propose an arrangement so as to dispense with the vacuum pumps and a purification set.

For that purpose, the protective arrangement for the welding field according to the invention comprises a casing so as to surround the welding field, this casing being provided with an inlet port for an inert gas and an exhaust port for the said gas, the inside wall of the casing being of aerodynamic shape so as to provide a substantially laminar flow of the said gas inbetween the two ports so as to prevent a blow-out of the arc built up between an electrode and the elements to be welded.

According to an advantageous form of embodiment of the object of the invention, in the case that at least one of the components to be welded is of substantially tubular shape and is rotated during the welding operation around its longitudinal axis, the casing comprises a first duct and a second duct connected to one another, the first duct surrounding the electrode and being in communication with a supply of the said inert gas, the second duct being intended to surround the part of the elements to be welded and having a venturi shaped flared opening, this opening being provided for the discharge of the inert gas admitted in the first duct.

Other details and features of the invention will become apparent from the description hereinafter and the accompanying drawings given by way of non limiting example, of two particular forms of embodiment of the object of the invention.

In the two figures the same reference numerals refer to similar components.

Figure 1:
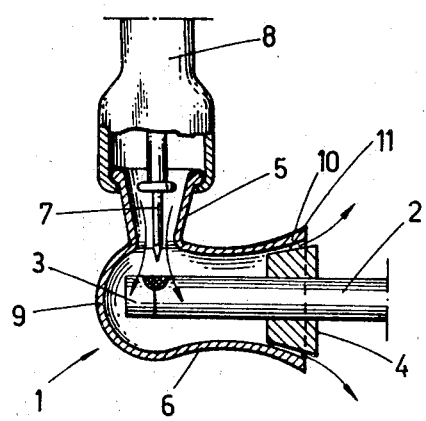
FIGURE 1 shows an elevational view, partially broken away, of a first form of embodiment of the object of the invention.

The protective arrangement for arc welding comprises a casing 1 mounted on one of the ends of a tube 2, in a material reactive at a high temperature in the presence of oxygen, and whereon is fitted a plug 3 to be welded on to the tube 2. This tube is threaded inside a ring 4 in the shape of a truncated cone and is rotated around its axis during the welding operation.

Thes casing 1 comprises a first duct 5 and a second duct 6 connected to one another. The first duct 5 surrounds an electrode 7 and is connected by means of pipe 8, wherein is fitted the electrode 7, to a tank containing an inert gas such as argon. This duct 5 is in the shape of a truncated cone connected by its smaller base to the top part of duct 6 so as to establish a venturi pipe. The second duct extends at right angles to the first duct 5 and the end thereof adjacent to the duct 5 is closed by a wall 9, the internal face thereof being substantially of spherical shape, in the direction of its other end the duct 6 is of venturi shape comprising a flared opening 10 allowing the discharge of the inert gas admitted to the casing 1 through the pipe 8.

The inside diameter of the ring 4 in the shape of a truncated cone substantially corresponds to the diameter of tube 2, this ring being fitted by the smaller base thereof in the flared opening 10, so as to leave between the said ring 4 and the inner wall of the said opening 10, an annular increasing space 11 permitting the discharge of the said inert gas without any back flow of the said gas towards the interior of the casing being able to take place.

The particular shape of the casing according to the invention allows a laminar flow of the protective inert gas at the location of the arc in order to prevent a blow out of the latter and the diffusion of atmospheric air towards the welded part.

The casing 1 is produced from a dielectric material resistant to thermal shocks, this material being made for example from a synthetic material known by the name of "Pyrex."

Figure 2:
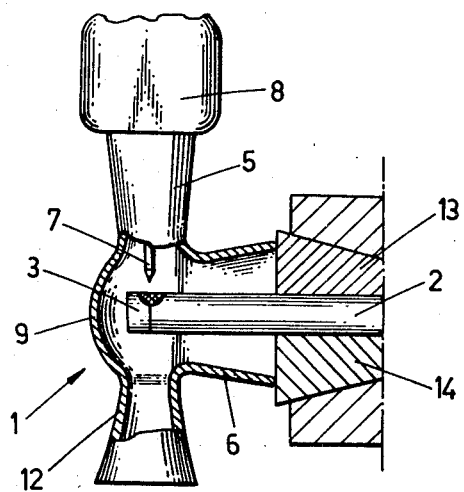
FIGURE 2 shows an elevational view, partially broken away, of a second form of embodiment of the object of the invention.

FIGURE 2 shows a second form of embodiment of the casing 1 according to the invention. This casing 1 is also provided with two ducts 5 and 6 connected together and the longitudinal axes whereof extend at right angles one with reference to the other. The shape of these ducts 5 and 6 corresponds substantially to that of the casing shown in FIGURE 1.

However, a third duct 12 communicates at one of the ends thereof with the duct 6 at a point opposite to the point where the first duct 5 joins the duct 6. The said duct 12 is of venturi shape and is to be used to exhaust the inert gas admitted inside the casing 1.

By means of the said additional duct 12, the tube 2 to be welded may be gripped between two half cones 13 and 14 of a mandrel driven in a rotary motion around the axis of tube 2.

It is well understood that the invention is not limited to the forms of embodiment described and that many changes may be contemplated without departing from the scope of the present patent application.

I claim:

1. A protective arrangement for the welding field in the case of arc welding substantially cylindrical elements formed of a metal reactive at high temperatures in the presence of air, comprising a casing having an electrode mounted therein, means for mounting said casing on an element being welded for rotation about the longitudinal axis thereof, said casing comprising a first duct and a second duct connected to one another, said first duct surrounding said electrode and being in communication with a supply of inert gas, said second duct surrounding a part of said element being welded and having a venturi-shaped flared opening providing for the discharge of the inert gas admitted to the first duct, said second duct further having an inside wall providing a substantially laminar flow of the gas about said element to prevent a blow-out of the arc built-up between the electrode and the element being welded.

2. An arrangement as claimed in claim 1 wherein said flared opening provides the opening for introducing the portion of the element being welded, said mounting means comprising ring means having the shape of a truncated cone and being threaded on the element with the smaller base of said ring fitted in the flared opening leaving an annular space between the ring and inner wall of said second duct allowing flow of the inert gas.

3. An arrangement as claimed in claim 1 wherein the interior of the first duct is at least partially shaped as a truncated cone the smaller end of which is connected to said second duct thereby forming a venturi pipe, the second duct being closed at the end thereof adjacent the first duct by an inner wall of substantially spherical shape and being of venturi shape in the direction of the other end thereof to provide an opening for the discharge of the inert gas admitted to the casing.

4. An arrangement as claimed in claim 1 wherein the longitudinal axes of the two ducts extend substantially at right angles to each other.

5. An arrangement as claimed in claim 1 further comprising a third duct one end of which is in communication with the second duct at the end opposite the end where the first and second ducts are joined, the other end of said third duct having a venturi-shaped flared opening permitting exhaust of the inert gas admitted to said casing.

6. An arrangement as claimed in claim 5 wherein the first and third ducts extend on either side of the second duct substantially in extension of one another.

7. An arrangement as claimed in claim 1 wherein said casing is formed from a dielectric material resistant to thermal shocks.

References Cited

UNITED STATES PATENTS

| | | | |
|---|---|---|---|
| 1,216,647 | 2/1917 | Armor | 313—231 |
| 2,544,711 | 3/1951 | Mikhalapou | 219—74 |
| 2,950,378 | 8/1960 | Tuthill | 219—74 |

JOSEPH V. TRUHE, Primary Examiner

U.S. Cl. X.R.

219—74